United States Patent Office 3,210,156
Patented Oct. 5, 1965

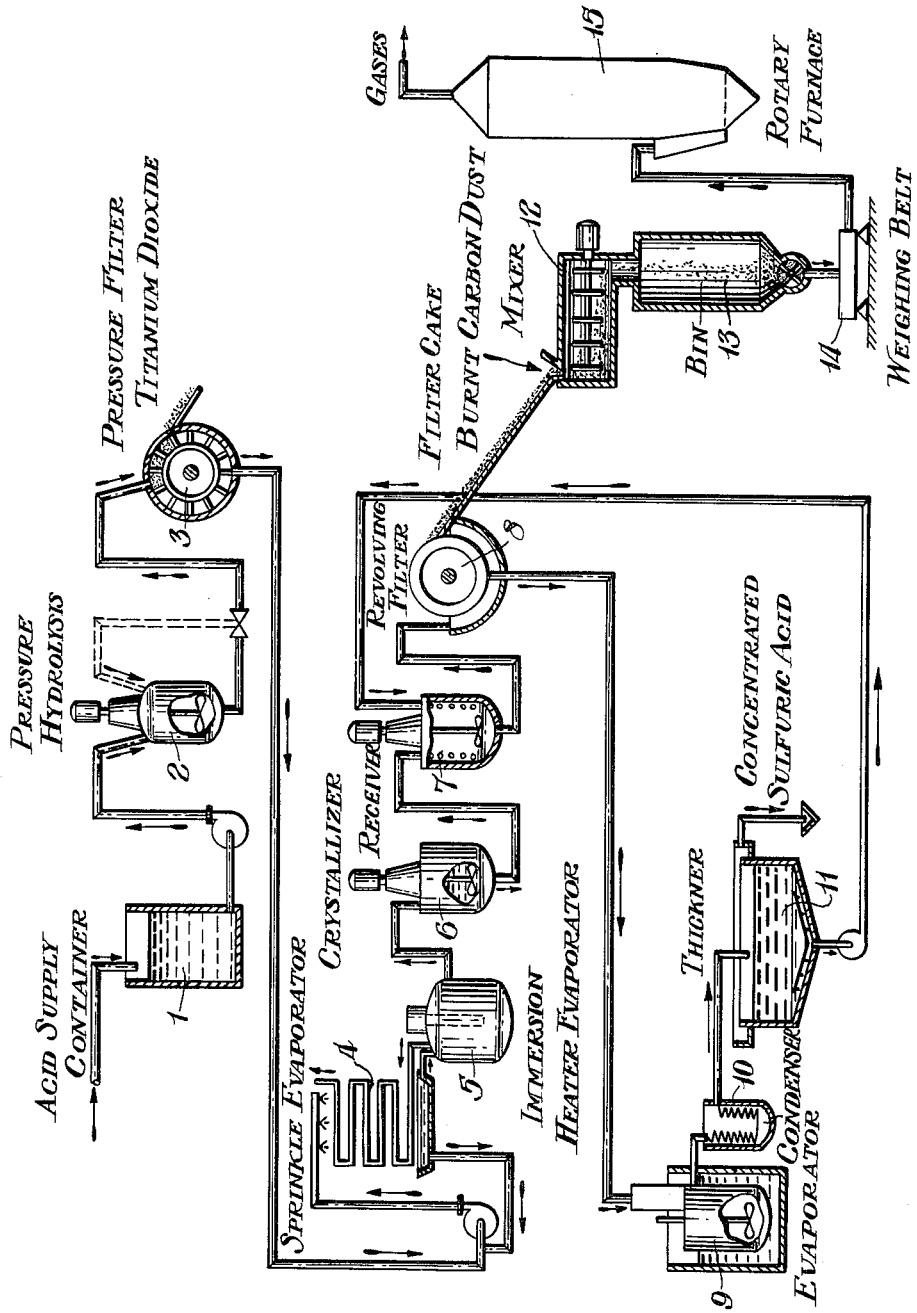

3,210,156
PROCESS FOR THE WORKING UP OF HYDROLYSIS ACIDS OBTAINED IN THE PRODUCTION OF TITANIUM DIOXIDE
Hans Zirngibl, Duisburg, Germany, assignor to Farbenfabriken Bayer Aktiengesellschaft, Leverkusen, Germany, a German corporation
Filed Nov. 3, 1961, Ser. No. 149,853
Claims priority, application Germany, Jan. 26, 1961, F 33,070
12 Claims. (Cl. 23—172)

The present invention is concerned with a process for the working up of hydrolysis acids obtained in the production of titanium dioxide by the sulphuric acid decomposition process.

The solution of the problem of working up hydrolysis acids obtained in the production of titanium dioxide by the sulphuric acid decomposition process in a technically and economically satisfactory manner becomes progressively urgent, since these acids, with their sulphate content, have to be kept away from the waste water being discharged into rivers.

The frequently suggested simple evaporation of these acids is not feasible because the high power expenditure required for the purpose cannot be compensated by the value of the recovered sulphuric acid alone, especially because the acid has to be concentrated to about 95 percent sulphuric acid content in order to be reused for titanium dioxide production.

In order to render the evaporation economical, various proposals have already been made for recovering the valuable substances present in the solutions. Thus, it has been suggested to redissolve the sulphate filter cake, obtained by evaporation, in water or dilute acid, to separate the ferrous sulphate heptahydrate by cooling, to hydrolyze the titanium sulphate still present in the filtrate and to separate it as titanium dioxide hydrate and to concentrate the residual acid. However, this is not a technically and economically feasible solution since the resulting titanium dioxide hydrate is not easily filterable, contaminated and not directly utilizable and, moreover, cooling and renewed evaporation are very expensive.

The evaporation in a two step process applied to pure sulphuric acids, or sulphuric acids containing only a little salt, initially to an about 75 percent sulphuric acid content and then to above a 95 percent sulphuric acid content, has already been proposed for the working up of the hydrolysis acids. Such a process can, however, technically not be carried out without difficulty. According to German Patent No. 887,142, the acid has to be concentrated in the second step to such a degree that it can be returned to the titanium dioxide production process. A concentration of 90 percent is indicated in the example of the said German patent. An acid of this kind, however, cannot be prepared in the conventional technical plants. According to German Patent No. 1,067,011, the hydrolysis acid is to be concentrated in a first step, together with the working up of the sulphate mixture obtained to valuable substances, to a 65–75 percent sulphuric acid content and in a second step to 96–98 percent sulphuric acid content. Finally, German Patent No. 1,069,152, which relates to the use of the salts obtained in the first step of evaporation by redissolution and to the further evaporation of the previously concentrated acid, teaches that the evaporation has to be conducted in two steps up to a concentration of more than 95 percent sulphuric acid content. Apart from the fact that the evaporation in the first step to more than 70 percent sulphuric acid content fails on account of difficulties arising during filtration, it becomes apparent from the concentration indicated for the final step that this process is not practically applicable to salt-containing hydrolysis acids.

On the other hand, it is known that anhydrous iron sulphate can be decomposed to a great etxent by reduction and iron oxide and sulphur dioxide obtained therefrom. However, this is not possible without difficulty with sulphate mixtures having a high sulphuric acid content such as are obtained when working up hydrolysis acids.

Other suggestions relate to the neutralization of sulphuric acids of general origin as well as of those obtained from hydrolysis acids, i.e. 60–70 percent acids, with iron oxide roasting residues and subsequent decomposition of the iron sulphate thus formed.

In spite of the numerous individual processes which have already been described in relation with the working up of hydrolysis acids, there is still a lack of a comprehensive process which comprises all the inter-dependent process steps in a technically and economically satisfactory manner. A process of this kind is the object of the present invention.

Thus, the process according to the present invention consists in concentrating the hydrolysis acids in conventional manner by means of submerged combustion burners or heaters in a first step, allowing, if necessary, a stay of some hours for the salt suspension thereby formed, during which more water may be removed from the suspension by evacuation, that is, by applying suction to the surface of the acid, so that the acid is subjected to vacuum evaporation or distillation at a subatmospheric pressure, and further salts may be allowed to crystallize out under the influence of the increased concentration and the cooling brought about by the evaporation of water, adding thick sludge from the concentrated acid in a second step subsequently obtained, filtering off the salts separated from the acid now containing not more than 70 percent sulphuric acid in a known manner, concentrating the filtrate by evaporation, in a manner also known, to a sulphuric acid content of between 93.5 and 95.0 percent in a second step, decanting the concentrated acid from the salts which again separate out and are re-used for the production of titanium dioxide, returning the thick bottom sludge to the concentrated salt suspension of the first step as indicated above, granulating the sulphuric acid-containing filter cake with addition of the roasting residue formed in a sulphate decomposition furnace and converting the granules into metal oxides and sulphur dioxide in an oil-, tar-, coal-, coke- and/or sulphur-heated decomposition furnace.

The aforesaid concentration limits of the first and second evaporation step are critical limits. If the concentration of the first step exceeds about 70 percent sulphuric acid content, the separated salts become unfilterable, especially if the hydrolysis acids contain more than 0.3 percent of aluminium sulphate. When attempting to attain a concentration of acid of more than 95 percent, the dephlegmators become clogged, the boiler content begins to bump and froth and the boiler corrodes. On the other hand, when operating with an acid concentration below 93.5 percent, a strong corrosion of the boiler takes place.

The separation of thick sludge from the concentrated acid by decanting and the return of this sludge to be concentrated salt suspension are of decisive importance for carrying out the whole process in a technically and economically satisfactory manner. The thick sludge could be filtered off from the concentrated sulphuric acid only with difficulty and excessive expense. The return of the decanted sludge to be concentrated salt suspension, on the other hand, is advantageous in more than one respect: since the thick sludge consists chiefly of crystals, these have a seeding action upon the sulphates precipitated from the concentrated acid, especially upon the scarcely crystallisable aluminium sulphate, thus avoiding supersaturation of the acid, on the one hand, and the obtaining of readily filterable salts, on the other hand. Since the thick sludge still includes a substantial quantity of concentrated sulphuric acid, the return leads to an increase of the concentration of the acid. Thus, on the one hand, still more salt is separated and on the other hand, the efficiency of the high-concentration plant increased.

When the return of the thick sludge is further combined with a water evaporation, optionally inserted into the residence of the salt suspension prior to filtering off the salts, and thus cooling by evacuation of the suspension, a further concentration increase is brought about and, in this way, a further salt separation. Cooling is advantageously effected up to about 60° C.

The above-mentioned residence in the filter receivers should expediently amount to about 10 hours. At a sulphuric acid concentration of the suspension of 66–70 percent, the salts are separated up to about 2–3.5 percent. It is especially advantageous to concentrate the hydrolysis acid by means of a submerged combustion heater, first to a content of about 55–65 percent sulphuric acid to allow the salt suspension thus formed to stay in a crystallizer, at a temperature of about 120 to 150° C., for about two hours then to evacuate it until a temperature of about 60–90° C. is attained, to add the thick sludge, and to keep the suspension, the sulphuric acid content of which has then risen to almost 70 percent, for at least another 6, preferably 10, hours, at the same temperature and then to filter it.

Another advantage of the present combined process consists in that only one filter cake with a smaller amount of sulphuric acid, in general about 12–25 percent, is obtained as compared with the known processes. In comparison, a filter cake, thoroughly filtered off from concentrated sulphuric acid, contains up to 60 percent sulfuric acid.

If the hydrolysis acid to be worked up contains so much salt that the suspension concentrated to 60–70 percent sulphuric acid content would become too viscous, due to the large amount of separated salts, the difficulty may easily be overcome by adding so much filtrate of the filter plant (60–70 percent sulphuric acid) to the hydrolysis acid entering the evaporator as to keep the salt suspension in the evaporator well flowing. The salt content of the suspension in the evaporator must not exceed 1000 grams per litre. The operation is advantageously carried out in such a manner that a suspension with about 700–900 grams of precipitate is obtained.

As has been mentioned above, a satisfactory utilization of the filter cake obtained is indispensable for a technically and economically advantageous process of working up hydrolysis acids. According to the present invention, this filter cake is granulated with the addition of roasting residue formed in a sulphate decomposition furnace and, if necessary, oil and/or tar and/or coal, the sulphuric acid content of the filter cake generally being between about 10 and about 30 percent, usually about 25 percent, dependent upon the composition of the starting acid, especially of the aluminium sulphate content, which may be thixotropic when having a high aluminium sulphate content as occurs, for example, when working up hydrolysis acids obtained in the decomposition of Canadian titanium ore. Conventional granulating devices, such as drums, plates and double paddle worms, may be used for the above purpose. The sulphuric acid present in the filter cake reacts with the iron oxide of the roasting residue with the formation of basic iron sulphates, the mass being cemented upon heating. In this way, surprisingly, compact granules are obtained which meet, without difficulty, the mechanical requirements to which they are subjected in the subsequent treatment in a shaft, revolving story, sintering or whirling furnace.

The quantity of roasting residue depends upon the water and sulphuric acid content of the filter cake and the type of the reducing agent to be subsequently added.

Heating required for setting the granules can be dispensed with by mixing the hot roasting residue, obtained in the decomposition furnace, with the filter cake. In this way, granulation temperatures of about 100° C. may be readily adjusted which are sufficient to obtain very compact granulation products.

As has already been described above, the granulation product is then converted, in a sulphate decomposition furnace, into metal oxides and sulphur dioxide with, if necessary, the addition of a reducing agent such as oil, tar, coal, coke, and/or sulphur. With a sulphur content of the furnace product, the sulphur dioxide content of the exhaust gases increases, thus facilitating and cheapening the purification of the gas, as well as the use of the exhaust gas for the production of sulphuric acid in contact furnaces. For this purpose, it is especially advantageous to inject into a lower part of such a furnace so much air that, after the combustion, a slightly reducing and inert gas atmosphere prevails, and to introduce an excess of air into an upper, colder part of the furnace at temperatures of below 850° C. Substances still present, such as sulphur, carbon disulphide, hydrogen sulphide, and hydrocarbons, are completely burnt.

This subdivision of the decomposition process into two steps is advantageous because the filter cake also contains sulphates which are difficult to decompose thermally, such as magnesium sulphate which normally decomposes only at temperatures considerably about 1000° C. According to the method described above, it is possible to operate at lower temperatures, for example at about 1000° C., and to attain complete decomposition in a shorter time.

Since the oxides formed do not tolerate very high flame temperatures in the furnace because of the risk of fusing, it is advantageous to produce the heating gases either in a precombustion chamber with insufficient air or to adjust them to a suitable temperature with direct flame formation by the supply of cooled end gas. These arrangements are, however, not necessary in whirl furnaces.

The process according to the present invention may also be improved by additional measures, if desired.

Thus, in connection with the aforementioned risk of corrosion in the high-concentation plant, I have, surprisingly, found that a content of vanadium salts of more than about 20 parts per million (p.p.m.) in the concentrated acid, such as is generally the case in acids derived from the titanium dioxide production, considerably reduces this risk.

Since, as I have further found, crystallized ferrous sulphate, and, to some extent, aluminium sulphate, precipitates vanadium sulphate so that the vanadium sulphate content remaining in solution drops to below about 4 p.p.m., the desired quantity of vanadium sulphate can only be retained in solution in the concentrated acid containing appreciable amounts of ferrous sulphate, upon evaporation of acids with a high salt content of about 3–4 percent especially of aluminium sulphate-containing salts, if the ferrous sulphate is previously converted as completely as possible into ferric sulphate.

This may be brought about by the addition of a sufficient amount of an oxidizing agent, such as nitric acid, nitrates, nitrites or nitrosylsulphuric acid, to the concentrated acid.

The limitation of the sulphuric acid concentration to 93.5–95.0 percent in the high concentration and the previous oxidation of the iron according to the invention, ensure that the process of concentrating sulphuric acid can be carried out in a technically especially safe manner.

The process according to the invention, as shown in the drawing can further be improved by briefly heating the hydrolysis acids 1, preferably in the presence of titanium dioxide hydrate crystal seeds, to about 140–180° C. and under an appropriate pressure 2 prior to evaporation. In this way, further titanium sulphate still dissolved in the hydrolysis acid is hydrolyzed to insoluble titanium dioxide hydrate. This titanium dioxide hydrate is then filtered 3 off before concentration of the hydrolysis acid. In this manner, about 97 percent of the originally dissolved titanium sulphate can be obtained in the form of titanium dioxide.

The heat of the vapour escaping when the pressure of the acid is released may be used for a preliminary heating of the hydrolysis acids by conducting the vapour through a heat exchanger.

The titanium ions still present in the hydrolysis acid may also be precipitated by adding, prior to concentration, an adequate amount of phosphoric acid or phosphates and separating the precipitate.

Furthermore, the concentration of hydrolysis acids by which according to the invention, as described above, the dissolved sulphates, and from these finally the corresponding oxides, are simultaneously obtained, may be used to dehydrate ferrous sulphate heptahydrate from which iron oxide can only be produced with difficulty, and also to obtain iron oxide therefrom. For this purpose, ferrous sulphate heptahydrate may be added to the hydrolysis acids prior to the concentration. During the transformation of the hydrolysis acids into salt suspensions with a content of about 65–70 percent sulphuric acid, water is removed from the heptahydrate and the added iron sulphate then precipitates, together with the other sulphates present in the hydrolysis acid, and is obtained as iron oxide in the course of the subsequent process.

The economy of the process may, finally, be still further improved by using the heat of the exhaust gases from the submerged combustion heater for a preliminary concentration of the hydrolysis acids by means of indirectly heated heat exchangers under a vacuum or by sprinkle evaporating over the heat exchanger 4 with acid under normal pressure. When using heat exchangers, it is advantageous to adjust the rate of the exhaust gas around the tubes or in the tubes of the heat exchanger to more than about 10 metres per second, preferably to 50–70 metres per second. In this way, for example, the hydrolysis acid can be pre-concentrated up to a 30 percent sulphuric acid content and thus the capacity of the evaporator can be substantially increased.

The following examples are given for the purpose of illustrating the invention:

Example 1

A hydrolysis acid containing 22.0 percent sulphuric acid, 1.8 percent basic titanium sulphate ($TiOSO_4$), 6.8 percent ferrous sulphate, 2.4 percent magnesium sulphate, 2.3 percent aluminium sulphate and 64.7 percent water is concentrated at about 150° C. in an evaporator 5 provided with a submerged combustion heater, the bulk of the sulphates of titanium and iron crystallizing out. The filtrate of the suspension discharged from the evaporator contains 60.6 percent sulphuric acid, 0.3 percent basic titanium sulphate ($TiOSO_4$), 1.0 percent ferrous sulphate, 2.4 percent magnesium sulphate, 5.9 percent aluminium sulphate and 29.8 percent water.

According to the invention it is not, however, filtered. On the contrary, the suspension continuously runs from the evaporator into a crystallizer vessel 6 provided with stirrer, the volume of which is chosen so that it stays there at 135° C. for an average of 2 hours.

Suction is subsequently applied to the suspension and water thereby evaporates. The suspension is cooled to 90° C. and more salts precipitate. The analysis of the filtrate is then 62.5 percent sulphuric acid, 0.2 percent basic titanium sulphate ($TiOSO_4$), 0.4 percent ferrous sulphate, 2.1 percent magnesium sulphate, 4.1 percent aluminium sulphate and 30.7 percent water.

If, however, according to the invention the suspension is further stirred in receiver 7 for 10 hours, with simultaneous cooling to 60–70° C., and the thick sludge is introduced from the thickener underflow of the high-concentration evaporator 9 containing about 1000–1100 grams of solids per litre into this suspension at 60–70° C. the concentration of the acid is further increased and the amount of the dissolved sulphates decreased by about another 0.5–0.8 percent. An acid is obtained which is readily filterable at 60° C. through a revolving filter 8 and which contains 65.5 percent sulphuric acid, 0.1 percent basic titanium sulphate ($TiOSO_4$), 0.2 percent ferrous suphate, 1.5 percent magnesium sulphate, 2.0 percent aluminium sulphate and 30.7 percent water.

A higher concentration by vacuum can also be dispensed with when, instead, an appropriately larger amount of thick sludge-containing, concentrated acid is returned. The return is, in each case, controlled in such a manner that the end concentration of the acid is 66–69 percent. At concentrations above 70 percent, the following separation of the salts is technically unfeasible.

The suspension is now filtered. The filter cake thereby obtained contains 25.6 percent sulphuric acid, 8.0 percent basic titanium sulphate ($TiOSO_4$), 30.0 percent ferrous sulphate, 9.6 percent magnesium sulphate, 8.7 percent aluminium sulphate and 18.1 percent water.

0.5 percent of a 65 percent nitric acid are added to the filtrate. The acid is then fed to a high concentration evaporator 9 plant including evaporator 10 of known design. By an appropriate temperature control, the concentration is maintained at 93.5–95 percent.

The acid running off contains 120–180 grams of sludge per litre. It is cooled and clarified in a Dorr thickener 11. The thick sludge is returned as described.

100 parts by weight of the cake, obtained in the first concentration step, containing the separated salts of the first and second concentration step are mixed 12 with 25–30 parts by weight of roasted residue dust from the sulphate decomposition and milled in a granulation drum with the addition of a little water to form granules. Shortly before leaving the granulation drum, fine dust of roasting residue or coke is sprinkled on it. Granulation is controlled by the amount of the returned roasting residue dust in accordance with the moisture content of the cake, the temperature of the roasting residue and the desired size of granules. The mixture is then passed through a bin 13 onto a weighing belt 14.

The granules are introduced into a rotary furnace 15 in which a temperature of 1050° C. is generated by separately introducing oil and solid sulphur. The combustion air is so measured that there is no excess and insufficient oxygen in the whirl bed. Above the whirl bed, secondary air is blown in to such an extent that the gas mixture leaving the furnace contains about 2 percent oxygen. The decomposition is brought about by 60 percent of oil and 40 percent of sulphur. The exhaust gas contains 16–17 percent of sulphur dioxide.

The gas passes a dust collecting plant and is then fed to a sulphuric acid contact furnace of conventional design. Sulphur dioxide is thereby converted into 98 percent sulphuric acid.

Example 2

A hydrolysis acid containing 22.0 percent sulphuric acid, 1.2 percent basic titanium sulphate ($TiOSO_4$), 8.0 percent ferrous sulphate, 1.7 percent magnesium sulphate, 0.3 percent aluminium sulphate and 66.8 percent water is concentrated in a submerged combustion heater evaporator at 150° C. The filtrate of the suspension leaving the evaporator initially contains 65.0 percent sulphuric acid, 0.06 percent basic titanium sulphate ($TiOSO_4$), 0.3 percent ferrous sulphate. 0.77 percent magnesium sulphate, 0.8 percent aluminium sulphate and 33.2 percent water and, after cooling under vacuum, contains 67.5 percent sulphuric acid, 0.05 percent basic titanium sulphate (TiOSO$_4$), 0.3 percent ferrous sulphate, 0.75 percent magnesium, 0.6 percent aluminium sulphate and 30.9 percent water.

The stay in the cooling system amounts to 2–4 hours. By returning the sludge underflow from the concentrated acid, the concentration of the filtrate is increased to about 70 percent sulphuric acid content.

Filtration now starts. The filter salt obtained, after briefly washing with hydrolysis acid, contains 12.0 percent sulphuric acid, 7.2 percent basic titanium sulphate (TiOSO$_4$), 52.5 percent ferrous sulphate, 8.0 percent magnesium sulphate, 1.8 percent aluminium sulphate and 18.5 percent water.

The further working up is carried out as indicated in Example 1.

Example 3

The preliminary separation of titanium dioxide from the residual titanium sulphate of the hydrolysis acid is performed as follows:

The acid of the composition given in Example 1 or 2 passes a container provided with heating coils where it is preheated to about 95° C. with exhaust steam from the following expansion. It is then fed by measuring and pressure pumps into a pressure vessel and heated with direct steam to 170° C. corresponding to a pressure of 6.5 atmospheres. It then passes a series of autoclaves provided with stirrers and under the same pressure. The autoclaves have a capacity which allow a stay of 20–30 minutes. The final stirrer autoclave is provided with an expansion valve. The emergent steam is returned for heating the dilute acid. The acid, which has only 3 percent of the original titanium sulphate content, is then filtered from the precipitated, easily filtrable titanium dioxide hydrate, fed into the evaporators and further treated as described in Examples 1 and 2. The yield of titanium dioxide hydrate amounts to 97 percent referred to the initial titanium sulphate content of the hydrolysis acid. The filter cake then contains only 0.2 percent basic titanium sulphate (TiOSO$_4$).

Example 4

A hydrolysis acid is treated with sufficient iron sulphate heptahydrate to give it the following composition: 18 percent sulphuric acid, 15 percent ferrous sulphate, 2.0 percent other salts and 65 percent water.

Since the suspension would solidify by direct evaporation in submerged combustion heaters, there is continuously returned to the evaporator 1 part by weight of 67 percent sulphuric acid, obtained by evaporation and filtering, per 8 parts by weight of hydrolysis acid. If greater amounts of iron sulphate are to be added for dehydrating, the hydrolysis acid, which then would enter the evaporator in the form of a suspension, would have to be diluted with greater amounts of returning acid, the amounts being dependent on the amount of iron sulphate added. The process is otherwise carried out as described in Examples 1 and 2.

Example 5

A hydrolysis acid of the composition described in Example 1 or 2 is pumped over an open-surface condenser made of graphite tubes. The exhaust gas from the first submerged combustion heater-evaporation step is passed through the tubes of this condenser at an inlet rate between 60 and 70 meters per second and, at the same time, a certain amount of air is passed around these tubes which are provided with a jacket. The air is introduced as such a rate that when it leaves the condensers it is just saturated with moisture. The hydrolysis acid is thereby preliminarily concentrated from 20 percent to 29 percent sulphuric acid content. It then runs continuously into the immersion heater evaporator. By this preliminary concentration, the capacity of the evaporator is nearly doubled.

The process is otherwise carried out as indicated in Examples 1 and 2.

Example 6

1000 cubic metres of a gas-stream mixture from the submerged combustion heater evaporator with 60 percent of water steam and a temperature of about 120–140° C. have, upon cooling, a utilizable heat quantity (actual and latent heat) of about 240,000 kilogram calories. This exhaust gas passes around the tubes of a heat exchanger at a flow speed of more than 10 metres/second. The heat-absorbing hydrolysis acid is drawn under vacuum through the tubes. In this way, 1.45 tons of acid are concentrated from 20 to 29 percent sulphuric acid content at a boiling temperature of 45° C. The heat-absorbing hydrolysis acid can also be pumped through the tubes while continuously adding fresh hydrolysis acid and the evaporation, following the heat exchanger, carried out in an expansion vessel under vaccum. Alternatively, the hydrolysis acid can also be pumped as a falling film through the tubes. At a flow rate of 10 metres/second, the specific heat transferred per unit surface area is 100. At 30 metres/second it is then about 400.

I claim:

1. A process for the recovery of valuable products from waste sulfuric acid obtained from the hydrolysis step in the production of titanium dioxide by concentrating said waste sulfuric acid, precipitating and separating the metal salts contained in said sulfuric acid and decomposing said metal salts into metal oxides and SO$_2$, the process which comprises
    (a) concentrating the waste sulfuric acid by evaporation at temperatures of between 140–160° C. to produce a suspension containing a 55–70% sulfuric acid and suspended metal salts in a concentration of between 700–900 g./l.
    (b) cooling said suspension of step (a) to a temperature of between 60–90° C. and precipitating said suspension by adding the thick sludge obtained in step (d) of this process from a previous process batch of waste sulfuric acid,
    (c) filtering the resultant precipitate obtained in step (b) after standing for at least 6 hours, thereby separating a 55–70% sulfuric acid from the resultant filter cake,
    (d) concentrating the 55 to 70 percent sulfuric acid obtained in step (c) by evaporation to produce a 93.5 to 95.0 percent sulfuric acid containing a thick sludge,
    (e) separating the 93.5 to 95.0 percent sulfuric acid from the thick sludge by decantation,
    (f) combining the filter cake obtained in step (c) with a sulfate-roasting residue obtained in step (g) of this process from a prior batch of waste sulfuric acid and granulating the resulting mixture, and
    (g) roasting the resulting granulated mixture obtained in step (f) to convert it to sulfur dioxide and a sulfate-roasting residue of metallic oxides.

2. Process according to claim 1, wherein the cooling to 60–90° C. is brought about by evaporation of water under a vacuum.

3. Process according to claim 1, wherein the salt suspension obtained in step (b) is allowed to stand for 10 hours before filtering.

4. Process according to claim 1 characterized by granulating the mixture of filter cake and the sulfate roasting residue by the addition of material selected from the group consisting of oil, tar and coal.

5. Process according to claim 1 characterized by decomposing the granulated mixture in the lower part of a furnace with jacket heating by blowing in so much air that a slightly reducing gas atmosphere prevails, excess air being blown into an upper, colder part of the furnace.

6. Process according to claim 1 characterized by decomposing the granulated mixture in the lower part of a whirl furnace by blowing in so much air that a slightly reducing gas atmosphere prevails, excess air being blown into an upper, colder part of the furnace.

7. Process according to claim 1 characterized by heating the hydrolysis acids, prior to step (a), to 140–180° C. under pressure and separating the titanium dioxide hydrate thereby precipitated.

8. Process according to claim 1 characterized by adding to the waste sulfuric acids, prior to step (a), phosphoric acid in order to precipitate the titanium ions dissolved therein and separating the precipitate.

9. Process according to claim 1 characterized by adding ferrous sulphate heptahydrate to the waste sulfuric acids prior to step (a).

10. Process according to claim 1 characterized by preconcentrating the waste sulfuric acid prior to step (a) by using the exhaust gas from the step (a) of a previous process batch of waste sulfuric acid for the preliminary evaporation of the hydrolysis acids by means of indirect heat exchange under a vacuum.

11. Process according to claim 1 characterized by preconcentrating the waste sulfuric acid prior to step (a) by using the exhaust gas from the step (a) of a previous processed batch of waste sulfuric acid for preliminary evaporation of the hydrolysis acids by sprinkling the heat exchanger with hydrolysis acid under normal pressure.

12. A process for the recovery of valuable products from waste sulfuric acid obtained from the hydrolysis step in the production of titanium dioxide by concentrating said waste sulfuric acid, precipitating and separating the metal salts contained in said sulfuric acid and decomposing said metal salts into metal oxides and $SO_2$, the process which comprises
   (a) concentrating the waste sulfuric acid by evaporation to produce 55 to 70% sulfuric acid containing precipitated salts up to a concentration of 1000 g./l.,
   (b) adding to said 55 to 70 percent sulfuric acid containing precipitated salts a thick sludge obtained step
   (d) of this process from a prior processed batch of waste sulfuric acid to produce a suspension,
   (c) filtering the resulting suspension obtained in step (b) thereby separating the 55 to 70 percent sulfuric acid from the resulting filter cake,
   (d) concentrating the 55 to 70 percent sulfuric acid obtained in step (c) by evaporation to produce a 93.5 to 95.0 percent sulfuric acid containing a thick sludge,
   (e) separating the 93.5 to 95.0 percent sulfuric acid from the thick sludge by decantation,
   (f) combining the filter cake obtained in step (c) with a sulfate-roasting residue obtained in step (g) of this process from a prior batch of waste sulfuric acid and granulating the resulting mixture, and
   (g) roasting the resulting granulated mixture obtained in step (f) to convert it to sulfur dioxide and a sulfate-roasting residue of metallic oxides.

References Cited by the Examiner

UNITED STATES PATENTS

| | | | |
|---|---|---|---|
| 2,078,088 | 4/37 | Mantius et al. | 23—172 X |
| 2,098,056 | 11/37 | McBerty | 23—172 |
| 2,184,419 | 12/39 | Fowler | 23—172 X |
| 2,185,095 | 12/39 | Smith et al. | 23—172 X |
| 2,616,790 | 11/52 | Swindin | 23—172 |
| 2,662,812 | 12/53 | Shaw | 23—172 |
| 3,121,620 | 2/64 | Zirngibl et al. | 23—172 |

FOREIGN PATENTS

| | | |
|---|---|---|
| 1,067,011 | 10/59 | Germany. |
| 1,069,125 | 11/59 | Germany. |

MAURICE A. BRINDISI, *Primary Examiner.*

GEORGE D. MITCHELL, *Examiner.*